(12) United States Patent
Kim et al.

(10) Patent No.: US 11,822,768 B2
(45) Date of Patent: Nov. 21, 2023

(54) ELECTRONIC APPARATUS AND METHOD FOR CONTROLLING MACHINE READING COMPREHENSION BASED GUIDE USER INTERFACE

(71) Applicant: SAMSUNG ELECTRONICS CO., LTD., Suwon-si (KR)

(72) Inventors: Jaewon Kim, Suwon-si (KR); Haejun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 16/814,150

(22) Filed: Mar. 10, 2020

(65) Prior Publication Data
US 2020/0293168 A1   Sep. 17, 2020

(30) Foreign Application Priority Data

Mar. 13, 2019   (KR) .................. 10-2019-0028524

(51) Int. Cl.
*G06F 3/0484* (2013.01)
*G06F 3/04883* (2022.01)
(Continued)

(52) U.S. Cl.
CPC .......... *G06F 3/0484* (2013.01); *G06F 3/0482* (2013.01); *G06F 3/04883* (2013.01); *G06F 9/453* (2018.02); *G06F 40/20* (2020.01)

(58) Field of Classification Search
CPC ........ G06F 3/0484; G06F 9/453; G06F 40/20; G06F 3/0482; G06F 3/04883;
(Continued)

(56) References Cited

U.S. PATENT DOCUMENTS

| | | | |
|---|---|---|---|
| 7,239,936 B2 * | 7/2007 | Suzuki | G05B 19/408 |
| | | | 700/159 |
| 7,757,013 B1 * | 7/2010 | Lawson | G06F 11/3485 |
| | | | 710/15 |

(Continued)

FOREIGN PATENT DOCUMENTS

| | | |
|---|---|---|
| EP | 3 340 659 A1 | 6/2018 |
| JP | 9-146671 | 6/1997 |

(Continued)

OTHER PUBLICATIONS

Tang et al. (https://arxiv.org/pdf/1706.02027.pdf; pub date: Aug. 4, 2017) (hereinafter Tang) (Year: 2017).*

(Continued)

*Primary Examiner* — Angie Badawi T Chuang
(74) *Attorney, Agent, or Firm* — Nixon & Vanderhye P.C.

(57) ABSTRACT

An electronic apparatus is provided. The electronic apparatus includes a display and a processor configured to control the electronic apparatus to: obtain a text corresponding to an input based on a machine reading comprehension (MRC) model, obtain a plurality of operation information by dividing the text into an operation unit of the electronic apparatus, obtain sequence information of the plurality of operation information based on the plurality of operation information and the obtained text, and control the display to provide a guide user interface (UI) to sequentially perform the plurality of operations based on the sequence information.

19 Claims, 11 Drawing Sheets

(51) Int. Cl.
  *G06F 40/20* (2020.01)
  *G06F 9/451* (2018.01)
  *G06F 3/0482* (2013.01)
(58) Field of Classification Search
  CPC .... G06F 3/04817; G06F 3/0488; G06F 40/30; G06F 3/167; G08B 7/06; G10L 15/26
  See application file for complete search history.

(56) References Cited

U.S. PATENT DOCUMENTS

| | | | |
|---|---|---|---|
| 7,890,332 B2* | 2/2011 | Aizawa | H04N 1/2369 704/270 |
| 8,311,797 B2* | 11/2012 | Beck | G06F 40/30 704/3 |
| 8,332,752 B2* | 12/2012 | Park | G06F 9/451 715/255 |
| 8,589,523 B2* | 11/2013 | Shivaji-Rao | H04N 21/4782 709/221 |
| 8,682,965 B2 | 3/2014 | Sugaya | |
| 8,913,198 B2* | 12/2014 | Shintani | H04N 21/431 348/734 |
| 9,055,209 B2* | 6/2015 | Shin | H04N 5/23218 |
| 9,164,647 B2* | 10/2015 | Ueno | G06F 3/0481 |
| 9,389,872 B2* | 7/2016 | Trowbridge | G06F 8/38 |
| 9,460,155 B2* | 10/2016 | Verma | G06F 16/24542 |
| 9,569,231 B2* | 2/2017 | Butin | G06F 9/453 |
| 9,697,522 B2* | 7/2017 | Perotti | G06Q 30/01 |
| 9,733,804 B2* | 8/2017 | Huang | H04N 7/17318 |
| 10,235,633 B2* | 3/2019 | Tereshkov | G06F 16/254 |
| 10,467,270 B2* | 11/2019 | Fan | G06N 3/084 |
| 10,893,851 B2* | 1/2021 | Kruecker | A61B 8/4245 |
| 2002/0026320 A1 | 2/2002 | Kuromusha et al. | |
| 2002/0105829 A1* | 8/2002 | Akamatsu | G11C 16/30 365/185.18 |
| 2003/0001896 A1* | 1/2003 | Johnson | G06F 8/71 715/771 |
| 2004/0199636 A1* | 10/2004 | Brown | G06F 16/958 709/227 |
| 2007/0118514 A1* | 5/2007 | Mariappan | G06F 16/951 |
| 2008/0046916 A1* | 2/2008 | Shivaji-Rao | H04N 21/4432 725/25 |
| 2008/0136821 A1* | 6/2008 | Okano | G06T 11/206 345/440 |
| 2008/0195946 A1* | 8/2008 | Peri-Glass | G06F 9/453 715/715 |
| 2008/0222521 A1* | 9/2008 | Beck | G06F 40/30 715/273 |
| 2009/0265664 A1* | 10/2009 | Shin | H04N 5/232933 715/810 |
| 2010/0082946 A1* | 4/2010 | Fuchigami | G06F 9/30058 712/205 |
| 2010/0205530 A1* | 8/2010 | Butin | G06F 9/453 715/715 |
| 2010/0221686 A1* | 9/2010 | Johnson | A63F 3/00006 434/129 |
| 2010/0306249 A1* | 12/2010 | Hill | G06Q 50/01 707/769 |
| 2011/0047514 A1 | 2/2011 | Butin et al. | |
| 2011/0138327 A1* | 6/2011 | Scott | G06F 3/0481 715/810 |
| 2011/0235549 A1* | 9/2011 | Ahlers | H04L 41/08 370/255 |
| 2012/0060091 A1* | 3/2012 | Ueno | G06F 3/0481 715/705 |
| 2012/0066189 A1* | 3/2012 | Kumar | G06F 16/40 707/703 |
| 2012/0271636 A1* | 10/2012 | Fujisawa | G10L 15/22 704/270 |
| 2013/0061138 A1* | 3/2013 | Spector | G06F 40/186 715/256 |
| 2013/0166789 A1* | 6/2013 | Lee | G06F 13/105 710/15 |
| 2013/0215116 A1* | 8/2013 | Siddique | G06Q 20/204 345/420 |
| 2013/0247006 A1* | 9/2013 | Trowbridge | G06F 9/453 717/126 |
| 2013/0314609 A1* | 11/2013 | Shintani | H04N 21/431 348/734 |
| 2014/0101546 A1* | 4/2014 | Taoka | G06F 3/0482 715/708 |
| 2014/0122486 A1* | 5/2014 | Simard | G06F 16/258 707/737 |
| 2014/0184524 A1* | 7/2014 | Schiefer | G06F 3/0484 345/173 |
| 2014/0229835 A1* | 8/2014 | Ravine | H04L 65/4069 715/720 |
| 2015/0124944 A1* | 5/2015 | Perotti | G06Q 30/01 379/88.01 |
| 2015/0254561 A1* | 9/2015 | Singal | G06F 16/24564 707/713 |
| 2015/0261305 A1* | 9/2015 | Lee | G06F 3/011 345/157 |
| 2016/0179345 A1 | 6/2016 | Zhao et al. | |
| 2016/0210602 A1* | 7/2016 | Siddique | G06Q 20/384 |
| 2018/0069899 A1* | 3/2018 | Lang | G06F 8/38 |
| 2018/0176688 A1* | 6/2018 | Baek | H04S 7/40 |
| 2018/0286400 A1* | 10/2018 | Seo | G10L 15/22 |
| 2018/0300407 A1* | 10/2018 | Wolny | G06N 20/00 |
| 2018/0314489 A1* | 11/2018 | Seo | G10L 15/22 |
| 2019/0018205 A1* | 1/2019 | Lee | G02B 6/389 |
| 2019/0019078 A1* | 1/2019 | Hwang | G06F 40/30 |
| 2019/0102145 A1* | 4/2019 | Wilberding | G06F 3/167 |
| 2019/0108273 A1* | 4/2019 | Li | G06F 16/35 |
| 2019/0121495 A1* | 4/2019 | Latheef | G06F 9/453 |
| 2019/0155907 A1* | 5/2019 | Park | G06F 40/247 |
| 2019/0156220 A1* | 5/2019 | Zhu | G06N 3/0445 |
| 2019/0164556 A1* | 5/2019 | Weber | G06F 3/167 |
| 2019/0213480 A1* | 7/2019 | Lim | G06F 40/10 |
| 2019/0311064 A1* | 10/2019 | Chakraborty | G06F 16/90332 |
| 2020/0020060 A1* | 1/2020 | Avery | G06Q 50/186 |
| 2020/0250608 A1* | 8/2020 | Sharma | G06Q 10/06398 |
| 2021/0007774 A1* | 1/2021 | Rodrigues | A61B 34/76 |
| 2021/0191345 A1* | 6/2021 | Pabla | H04L 12/2823 |

FOREIGN PATENT DOCUMENTS

| | | |
|---|---|---|
| JP | 2005-107583 | 4/2005 |
| JP | 3964656 | 6/2007 |
| JP | 2012-073993 | 4/2012 |
| JP | 2017-146740 A | 8/2017 |
| JP | 2019-105868 A | 6/2019 |
| KR | 10-2012-0090149 | 8/2012 |
| KR | 10-2015-0043879 | 4/2015 |
| KR | 10-1842362 | 3/2018 |
| KR | 10-2018-0116725 | 10/2018 |
| WO | WO 2015/184186 A1 | 12/2015 |
| WO | WO 2018/057269 A1 | 3/2018 |

OTHER PUBLICATIONS

Search Report and Written Opinion dated Jun. 18, 2020 in counterpad International Patent Application No. PCT/KR2020/003252.
European Extended Search Report dated Nov. 16, 2021 for EP Application No. 20770311.7.
European Examination Report dated Feb. 20, 2023 for EP Application No. 20770311.7.

* cited by examiner

ELECTRONIC APPARATUS AND METHOD FOR CONTROLLING MACHINE READING COMPREHENSION BASED GUIDE USER INTERFACE

CROSS-REFERENCE TO RELATED APPLICATION

This application is based on and claims priority under 35 U.S.C. § 119 to Korean Patent Application No. 10-2019-0028524, filed on Mar. 13, 2019, in the Korean Intellectual Property Office, the disclosure of which is incorporated by reference herein in its entirety.

BACKGROUND

1. Field

The disclosure relates to an electronic apparatus and a method for controlling thereof. For example, the disclosure relates to an electronic apparatus using a machine reading comprehension (MRC) model and a method for controlling thereof.

2. Description of Related Art

Development in electronic technology has led to development and distribution of various types of electronic apparatuses.

Not only a type of an electronic apparatus, but also a function and an operation which an electronic apparatus may perform have been diversified.

However, since the various functions, operations, or the like, of an electronic apparatus are somewhat complex, there is a problem in that a silver (older) generation user who is not familiar with the latest electronic apparatus, or a user who is poor at handling an electronic apparatus may have a problem of deteriorated accessibility to various functions and operations.

Therefore, there is a need to provide a user with a method of using an electronic apparatus (for example, a method of executing functions and operations, a controlling method, or an approaching method) flexibly and actively through a machine learning algorithm, instead of simply providing an executing method and an approaching method for various functions and operations fixedly and formally, based solely on a manual for an electronic apparatus.

SUMMARY

Embodiments of the disclosure provide an electronic apparatus for providing a user interface (UI) for guiding a using method based on a manual of the electronic apparatus and a controlling method thereof.

An electronic apparatus according to an example embodiment includes: a display and a processor configured to control the electronic apparatus to: obtain a text corresponding to an input based on a machine reading comprehension (MRC) model, obtain a plurality of operation information by dividing the text into an operation unit of the electronic apparatus, obtain sequence information of the plurality of operation information based on the plurality of operation information and the obtained text, and control the display to provide a guide user interface (UI) to sequentially perform the plurality of operations based on the sequence information.

The operation unit may be based on a context that requires a user's touch input.

The processor is configured to control the electronic apparatus to: obtain current setting state information on the electronic apparatus, identify at least one operation information, among the plurality of operation information, pre-performed in the electronic apparatus based on the current setting state information, and obtain the sequence information based on remaining operation information other than the identified operation information.

The processor is configured to control the electronic apparatus to: obtain current setting state information of the electronic apparatus, obtain additional operation information required to execute a function corresponding to the obtained text, in addition to the plurality of operation information based on the current setting state information, and obtain the sequence information based on the plurality of operation information and the additional operation information.

The processor is configured to control the electronic apparatus to: provide a first guide UI based on information related to a touch input required to execute first operation information among the plurality of operation information based on the sequence information, based on a context of the electronic apparatus being changed based on a touch input corresponding to the first guide UI, control the display to provide a second guide UI based on information related to a touch input required to execute second operation information among the plurality of operation information based on the changed context and the sequence information.

The information related to the touch input may include at least one of a position or a touch type of the touch input.

The MRC model may include a question generation (QG) model configured to obtain a question and a question answer (QA) model configured to obtain an answer corresponding to the obtained question by performing natural language processing (NLP) based on a plurality of sentences included in a manual of the electronic apparatus.

The electronic apparatus may further include a communicator comprising communication circuitry, and the processor is configured to control the communicator to transmit the input to a server, and based on receiving a text corresponding to the input from the server, obtain the plurality of operation information and the sequence information based on the received text, and the text may be obtained based on the manual and the MRC model of the electronic apparatus.

The processor is configured to control the electronic apparatus to, based on an identification that at least one of the position or the touch type of the touch input not corresponding to the guide UI, provide at least one of a visual feedback or a sound feedback.

The processor is configured to control the electronic apparatus to: provide a UI for selecting any one of a manual mode or an automatic mode, and based on the automatic mode being selected, sequentially perform the plurality of operations by performing a touch input function corresponding to the guide UI.

The processor is configured to control the electronic apparatus to: perform a touch input function corresponding to the guide UI and provide a visual feedback indicative of performing the touch input function.

According to an example embodiment, a method of controlling an electronic apparatus includes: obtaining a text corresponding to an input based on a machine reading comprehension (MRC) model; obtaining a plurality of operation information by dividing the text into an operation unit of the electronic apparatus; obtaining sequence information of the plurality of operation information based on the plurality of operation information and the obtained text; and providing a guide user interface (UI) to sequentially perform the plurality of operations based on the sequence information.

The operation unit may be based on a context that requires a touch input.

The method may include obtaining current setting state information on the electronic apparatus, and the obtaining the sequence information may include identifying at least one operation information, among the plurality of operation information, pre-performed in the electronic apparatus based on the current setting state information; and obtaining the sequence information based on remaining operation information other than the identified operation information.

The method may include obtaining current setting state information of the electronic apparatus; and obtaining additional operation information required to execute a function corresponding to the obtained text, in addition to the plurality of operation information, based on the current setting state information, and the obtaining the sequence information may include obtaining the sequence information based on the plurality of operation information and the additional operation information.

The providing the guide UI may include providing a first guide UI based on information related to a touch input required to execute first operation information among the plurality of operation information based on the sequence information and, based on a context of the electronic apparatus being changed based on a touch input corresponding to the first guide UI, providing a second guide UI based on information related to a touch input required to execute second operation information among the plurality of operation information based on the changed context and the sequence information.

The information related to the touch input may include at least one of a position or a touch type of the touch input.

The MRC model may include a question generation (QG) model configured to obtain a question and a question answer (QA) model configured to obtain an answer corresponding to the obtained question by performing natural language processing (NLP) based on a plurality of sentences included in a manual of the electronic apparatus.

The obtaining the text may include transmitting the input to a server, and the text may be obtained based on a manual and the MRC model of the electronic apparatus.

The method may include, based on an identification that at least one of the position or the touch type of the touch input not corresponding to the guide UI, providing at least one of a visual feedback or a sound feedback.

According to various example embodiments, a user may be provided with an intuitive guide UI for a controlling method of an electronic apparatus corresponding to a user input, and may be provided with a use method considering a current setting state of the electronic apparatus.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

The disclosure will be described in greater detail below with reference to the accompanying drawings.

The terms used in the present disclosure and the claims are general terms identified in consideration of the functions of the various example embodiments of the disclosure. However, these terms may vary depending on intention, technical interpretation, emergence of new technologies, and the like of those skilled in the related art. Unless there is a specific definition of a term, the term may be understood based on the overall contents and technological understanding of those skilled in the related art.

In this disclosure, the expressions "have," "may have," "include," or "may include" or the like represent presence of a corresponding feature (for example: components such as numbers, functions, operations, or parts) and does not exclude the presence of additional feature.

The expression "At least one of A or/and B" should be understood to represent "A" or "B" or any one of "A and B."

As used herein, the terms "first," "second," or the like may denote various components, regardless of order and/or importance, and may be used to distinguish one component from another, and does not limit the components.

In addition, the description in the disclosure that one element (e.g., a first element) is "(operatively or communicatively) coupled with/to" or "connected to" another element (e.g., a second element) should be interpreted to include both the case that the one element is directly coupled to the another element, and the case that the one element is coupled to the another element through still another intervening element (e.g., a third element).

A singular expression includes a plural expression, unless otherwise specified. It is to be understood that the terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

The term such as "module," "unit," "part," and so on may be used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor (not shown).

In this disclosure, a term user may refer to a person using an electronic apparatus or an apparatus (for example: artificial intelligence (AI) electronic apparatus) that uses an electronic apparatus.

Hereinafter, various example embodiments of the disclosure will be described in greater detail with reference to the accompanying drawings.

Figure 1:
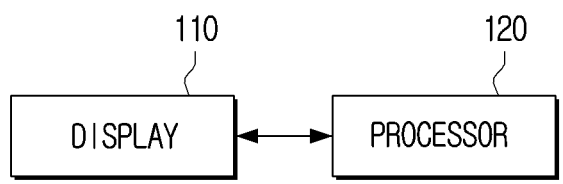
FIG. 1 is a block diagram illustrating an example configuration of an electronic apparatus according to an embodiment.

FIG. 1 is a block diagram illustrating an example configuration of an electronic apparatus according to an embodiment.

An electronic apparatus 100 according to various embodiments may be implemented as an apparatus having a display function, such as, for example, and without limitation, a TV, a smartphone, a tablet PC, a portable multimedia player (PMP), a personal digital assistant (PDA), a notebook computer, a smart watch, a head mounted display (HMD), a near eye display (NED), or the like. The electronic apparatus 100 may be implemented to include a display 110 of various types to provide a display function, such as, for example, and without limitation, a liquid crystal display (LCD), an organic light-emitting diode (OLED), a liquid crystal on silicon (LCoS), a digital light processing (DLP), a micro LED, a quantum dot (QD) display panel, and the like.

Various embodiments may be implemented through the electronic apparatus 100 not including a display function. For example, the electronic apparatus 100 may be implemented as various types of source devices that provide a content to a display device, such as, for example, and without limitation, a Blu Ray player, a digital versatile disc (DVD) player, a streaming content output device, a set-top box, or the like. As another example, various types of home appliance such as, for example, and without limitation, a speaker, a refrigerator, a washing machine, an air-conditioner, an air-purifier, various Internet of Things (IoT), or the like, may implement various embodiments. Hereinafter, the electronic apparatus 100 will be assumed as a user terminal device including a display 110, for convenient description.

Referring to FIG. 1, the display apparatus 100 includes the display 110 and a processor (e.g., including processing circuitry) 120.

The display 110 may provide various content screens that may be provided through the electronic apparatus 100. The content screen may include, for example, and without limitation, an application execution screen, various contents such as an image, a video, a text, music, a graphic user interface (GUI) screen, or the like.

The display 110 may display a text and a guide UI corresponding to the user input based on a manual (or a user guide) of the electronic apparatus 100 which will be described in greater detail below.

The processor 120 may include various processing circuitry and may, for example, and without limitation, be implemented with a digital signal processor (DSP), a microprocessor, and a time controller (TCON) which process a digital image signal, but this is not limited thereto. The processor 120 may include, for example, and without limitation, one or more among a central processing unit (CPU), a micro controller unit (MCU), a micro processing unit (MPU), a controller, an application processor (AP), a graphics-processing unit (GPU), a communication processor (CP), an advanced reduced instruction set computing (RISC) machine (ARM) processor, or the like, or may be defined as a corresponding term. The processor 120 may be implemented in a system on chip (SoC) type or a large scale integration (LSI) type which a processing algorithm is built therein or in a field programmable gate array (FPGA) type. The processor 120 may include various processing circuitry and perform various functions by executing computer executable instructions stored in a memory.

The processor 120 may obtain text corresponding to a user input based on a machine reading comprehension (MRC) model. The MRC model may, for example, be a machine reading model that reads and interprets a document and a manual related to the electronic apparatus 100 based on an artificial intelligence (AI) algorithm. For example, the MRC model may analyze documents using natural language processing (NLP) algorithms that are trained based on various types of deep learning, such as, for example, and without limitation, recurrent neural network (RNN) and convolution neural network (CNN), or the like. Documents, manuals, or the like, associated with the electronic apparatus 100 are not limited to the user manual distributed by a manufacturer of the electronic apparatus 100, and may include various types of data including a method of operating or using a plurality of functions included in the electronic apparatus 100.

The MRC model according to an embodiment may include a machine reading model applicable to a natural language evaluation index such as, for example, and without limitation, General Language Understanding Evaluation (GLUE) or Stanford Question Answering Dataset (SQuAD), or the like. According to an embodiment, the MRC model may be a model that reads and interprets a document, and finds a text (for example, an answer corresponding to a question) corresponding to a user input (for example, a question) based on the document. The MRC model according to an embodiment may, for example, be a model trained using a transformer-based neural network, in addition to RNN and CNN.

The MRC model according to an embodiment may include a question generation (QG) model and a question answer (QA) model for obtaining an answer to the obtained question by performing the NLP based on a plurality of sentences included in a manual of the electronic apparatus 100.

As an example, the QG mathematical model included in the MRC mathematical model may obtain a keyword (or a subject) of the corresponding sentence based on the sentence included in the manual. The MRC mathematical model may obtain the best form of question among the plurality of questions that may be generated in the corresponding sentence. The QA model may identify the corresponding sentence as an answer corresponding to the obtained question.

The processor 120 according to an embodiment may perform pre-processing on a plurality of sentences included in a manual of the electronic apparatus 100 to obtain a plurality of questions for each keyword and answers corresponding to each of the plurality of questions. A more description thereof will be provided below with reference to FIG. 3.

Figure 3:
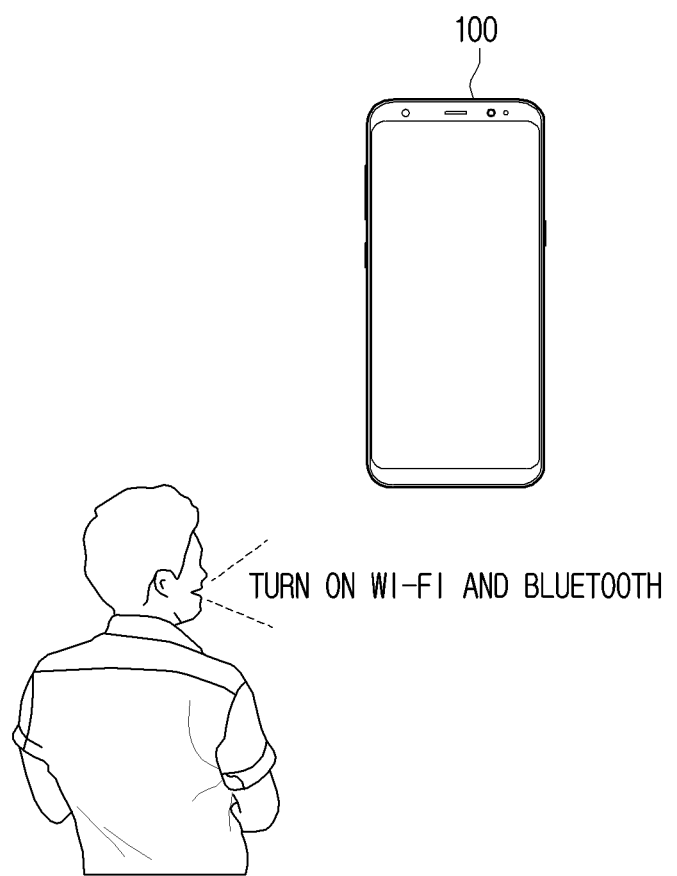
FIG. 3 is a diagram illustrating an example electronic apparatus and a user input according to an embodiment.

FIG. 3 is a diagram illustrating an example electronic apparatus and a user input according to an embodiment.

Referring to FIG. 3, the electronic apparatus 100 according to an example embodiment may receive a user input. For example, the electronic apparatus 100 may receive a use's uttered voice via a microphone (not shown) provided in the electronic apparatus 100. As another example, the electronic apparatus 100 may receive a user input via various types of interfaces (for example, a touch pad) provided in the electronic apparatus 100. In the following description, for convenience of description, it is assumed that a user's uttered voice is received through a microphone as a user input.

As shown in FIG. 3, if the user input "Turn on Wi-Fi and Bluetooth" is received as a user input, the processor 120 may obtain a text corresponding to the user input. According to an example, the processor 120 may identify a question based on the NLP algorithm with respect to the user input. For example, the processor 120 may identify a keyword included in the user input and select one of a plurality of questions for each keyword obtained from the QG model based on the identified keyword.

Referring to FIG. 3, the processor 120 may perform syntactic parsing on the user input. The processor 120 may then perform semantic analyzing for the parsed data and identify keywords (for example, Wi-Fi, Bluetooth, and turn-on) included in the user input. The processor 120 may then obtain a question corresponding to the identified keyword among the plurality of questions. For example, the processor 120 may obtain "How to turn on Wi-Fi?" and "How to turn on Bluetooth?"

The processor 120 according to an embodiment may obtain an answer corresponding to the obtained question. For example, the processor 120 may generate a question from a sentence included in a manual of the electronic apparatus 100 based on the MRC model, and obtain the sentence as an answer to the generated question. For example, the processor 120 may obtain the sentence in which "How to turn on Wi-Fi?" is obtained as an answer to the question. The embodiment is merely an example, and the processor 120 may perform the NLP for a user input to identify a keyword and obtain an answer corresponding to the identified keyword, in addition to a plurality of questions and answers to each of the plurality of questions obtained by performing pre-processing to a manual. For example, if "Let me know how to install application A" is received, the processor 120 may identify the application A and the installation method based on the NLP algorithm. The processor 120 may perform a search for a method of installing the application A to obtain an answer from a server. Meanwhile, for convenience of description, the answer to the question corresponding to the user input is collectively referred to as a text corresponding to the user input.

The processor 120 according to an embodiment may output a question corresponding to a user input based on the MRC model. In one example, when "How to turn on Wi-Fi?" and "How to turn on Bluetooth?" are obtained according to the user input, the processor 120 may output, as a user interface (UI), whether the user input is appropriately recognized, such as "Do you want to know how to turn on Wi-Fi and Bluetooth?" When a user's confirmation input to the corresponding UI is received, a text (or an answer) corresponding to the question may be obtained.

Returning to FIG. 1, the processor 120 according to an embodiment may obtain a text corresponding to a user input, perform the NLP on the obtained text, and classify the text into an operation unit of the electronic apparatus 100 to obtain a plurality of operation information. The processor 120 may then obtain sequence information of the plurality of operation information based on the plurality of operation information and the obtained text. A more detailed description thereof will be provided below with reference to FIG. 4.

Figure 4:
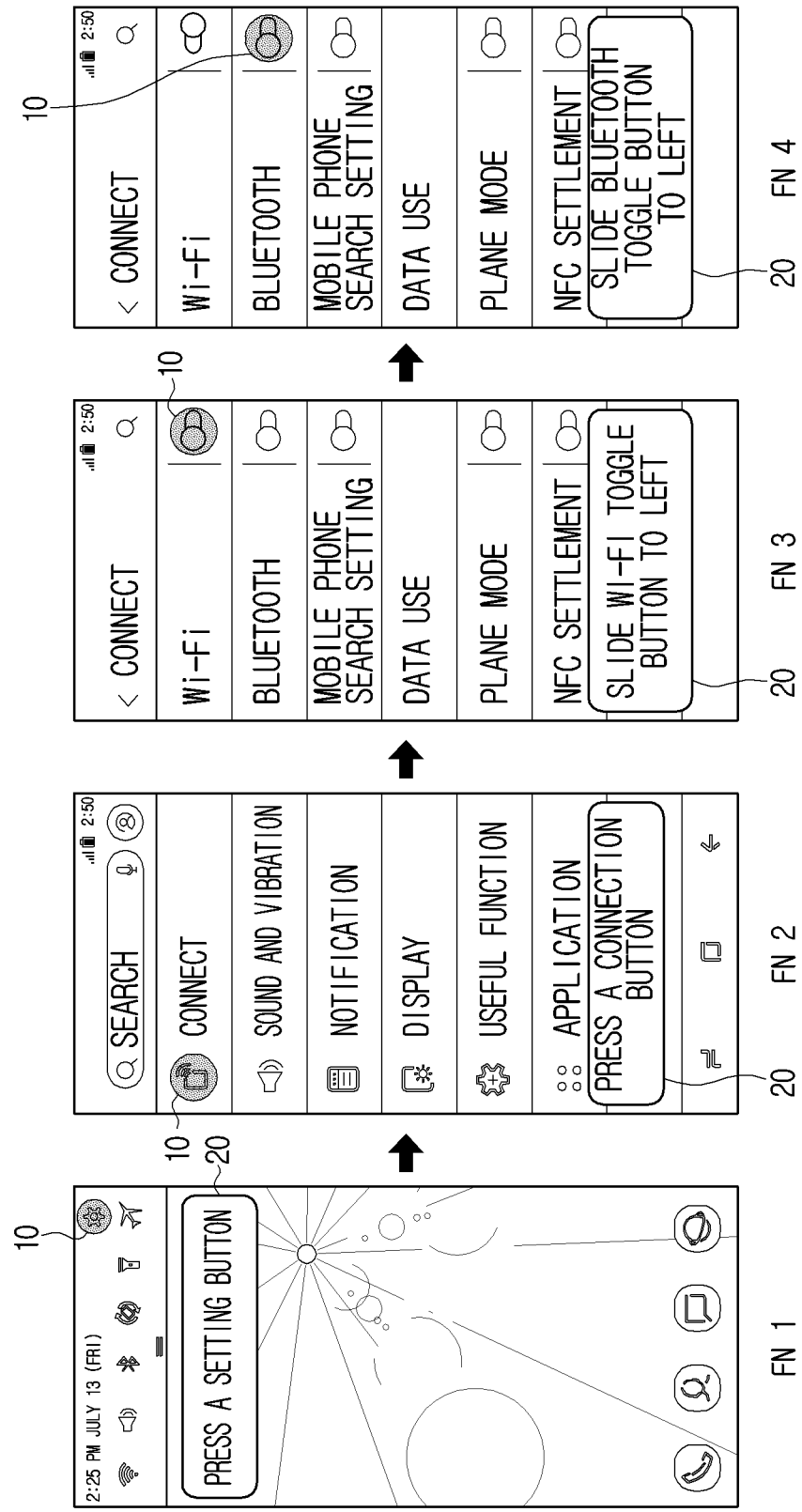
FIG. 4 is a diagram illustrating example operation information and sequence information according to an embodiment.

FIG. 4 is a diagram illustrating example operation information and sequence information according to an embodiment.

Referring to FIG. 4, when receiving a user input of "Please turn on Wi-Fi and Bluetooth," the processor 120 according to an embodiment may identify questions of "How to connect to Wi-Fi network?" and "How to connect to Bluetooth?" among a plurality of questions generated based on a plurality of sentences included in the manual of the electronic apparatus 100. The processor 120 may then obtain the sentence corresponding to the identified question as an answer (or text) for the question. According to an example, the processor 120 may obtain a sentence "Press a connection button on a setting screen→Slide a Wi-Fi toggle button to left" included in the manual of the electronic apparatus 100. The processor 120 may obtain "Press a connection button on a setting screen→Slide a Bluetooth toggle button to left" as a text corresponding to the user input.

The processor 120 may then perform the NLP on the obtained text to distinguish in the operation units of the electronic apparatus 100. The operation unit of the electronic apparatus 100 may be a unit based on a context which requires a user's touch input. The operation unit of the electronic apparatus 100 may be based on whether the touch input of the user is required, or the operation unit of the electronic apparatus 100 may be a unit based on whether the setting of the electronic apparatus 100 is changed, the screen provided through the display 110 is changed or the state of the electronic apparatus 100 is changed according to the touch input of the user.

For example, if "Press a connection button on a setting screen→Slide a Bluetooth toggle button to left" which is the text corresponding to the user input is received, the processor 120 may divide the text in operation units of the electronic apparatus 100 and obtain a plurality of operation information such as a setting button, a connection button, a Wi-Fi toggle button, or the like.

The processor 120 may then obtain sequence information based on the plurality of operation information and the corresponding text. For example, the processor 120 may set an order for each of the plurality of operation information based on the corresponding text. For example, the processor 120 may arrange a setting button→connection button→Wi-Fi toggle button in order based on the order of including a plurality of operations in the text. The processor 120 may obtain sequence information for a plurality of operations. The processor 120 according to an embodiment may assign Fn1, Fn2, Fn3, Fn4, etc. to each of the plurality of operations based on the sequence information.

The processor 120 according to an embodiment may provide a guide user interface (UI) 10 for sequentially performing a plurality of operations according to sequence information.

Referring to FIG. 4, the processor 120 may obtain a setting button, a connection button, a Wi-Fi toggle button, and a Bluetooth toggle button as a plurality of operations based on the text corresponding to the user input "Please turn on Wi-Fi and Bluetooth." The processor 120 may then assign an order to each of the plurality of operations to obtain sequence information. For example, the processor 120 may obtain the ordered sequence information in the order of a setting button→connection button→Wi-Fi toggle button→Bluetooth toggle button.

As illustrated in FIG. 4, the processor 120 may provide a first guide UI through the display 110 based on information related to a touch input required to perform first operation information Fn1 among a plurality of operation information according to the sequence information. For example, when the first operation information Fn1 is a setting button based on the sequence information, the processor 120 may provide the guide UI 10 to induce a touch input for a setting button. For example, the processor 120 may display the guide UI 10 in a predetermined size and color at a position of a setting button on a screen provided through the display 110.

When the context of the electronic apparatus 100 is changed based on the touch input corresponding to the first guide UI, the processor 120 according to an embodiment may control the display 110 to provide a second guide UI based on information related to the touch input required to perform the second operation information Fn2 among the plurality of operation information based on the changed context and the sequence information. The change in the context of the electronic apparatus 100 may include at least one of receiving a touch input, changing a screen, or changing a setting of the electronic apparatus 100.

Referring to FIG. 4, when the setting screen is displayed as the touch input for the first guide UI is received, the processor 120 may provide the second guide UI for inducing the touch input to the position of the connection button on the screen according to the second operation information Fn2 based on the sequence information. Information related to the touch input is not limited to the location of the touch input, and may include a touch type. For example, the processor 120 may display the guide UI 10 for inducing a user's tap touch input at a particular location on the screen, and may provide the guide UI 10 corresponding to various touch types such as drag touch, flick touch, pinch touch, spread touch, or the like. The detailed description thereof will be provided in FIG. 8.

The processor 120 according to an embodiment may provide a script 20, in addition to the guide UI 10. Referring to FIG. 4, the processor 120 may provide the script 20 for each operation information based on the obtained text, a description thereof on an area of the screen. For example, the processor 120 may provide the script 20 with "Press a setting button" with the guide UI 10 for inducing the touch of the setting button. As another example, the processor 120. As another example, the processor 120 may provide the script 20 "Press a connection button" corresponding to the second operation information Fn2 in the obtained text "Press a connection button on a setting screen→Slide a Wi-Fi toggle button to the left" along with the second guide UI for inducing the touch input required to perform the second operation information Fn2. As another example, the processor 120 may provide the script 20 "Slide Wi-Fi toggle button to left" corresponding to third operation information Fn3 along with a third guide UI for inducing a touch input required to perform the third operation information Fn3. As yet another example, the processor 120 may provide the script 20 "Slide Bluetooth toggle button to left" corresponding to fourth operation information Fn4 along with a fourth guide UI for inducing a touch input required to perform the fourth operation information Fn4.

The processor 120 according to an embodiment may output the script 20 provided along with the guide UI on the screen as a sound signal. For example, the processor 120 may perform the text to speech (TTS) to the script 20 to obtain a sound signal corresponding to the script 20, and output the sound signal along with the guide UI 10.

Returning to FIG. 1, the processor 120 according to an embodiment may obtain current setting state information of the electronic apparatus 100. The current setting state information may refer, for example to a setting value (for example, whether the function is turned on/off) for each of the plurality of functions included in the electronic apparatus 100, information about the application installed in the electronic apparatus 100 (for example, the application installation status, application version information, location of an icon for executing an application), a screen being displayed through the display 110, or the like. The processor 120 according to an embodiment may obtain current setting state information at a system level, or may obtain current setting state information through an application programming interface (API) call.

The processor 120 according to an embodiment may obtain sequence information by excluding some operation information among a plurality of operation information obtained from a text based on the current setting state information. As another example, the processor 120 may obtain sequence information by adding other operation information in addition to the plurality of operation information based on the current setting state information. This will be described in greater detail below with reference to FIGS. 5, 6 and 7.

Figure 5:
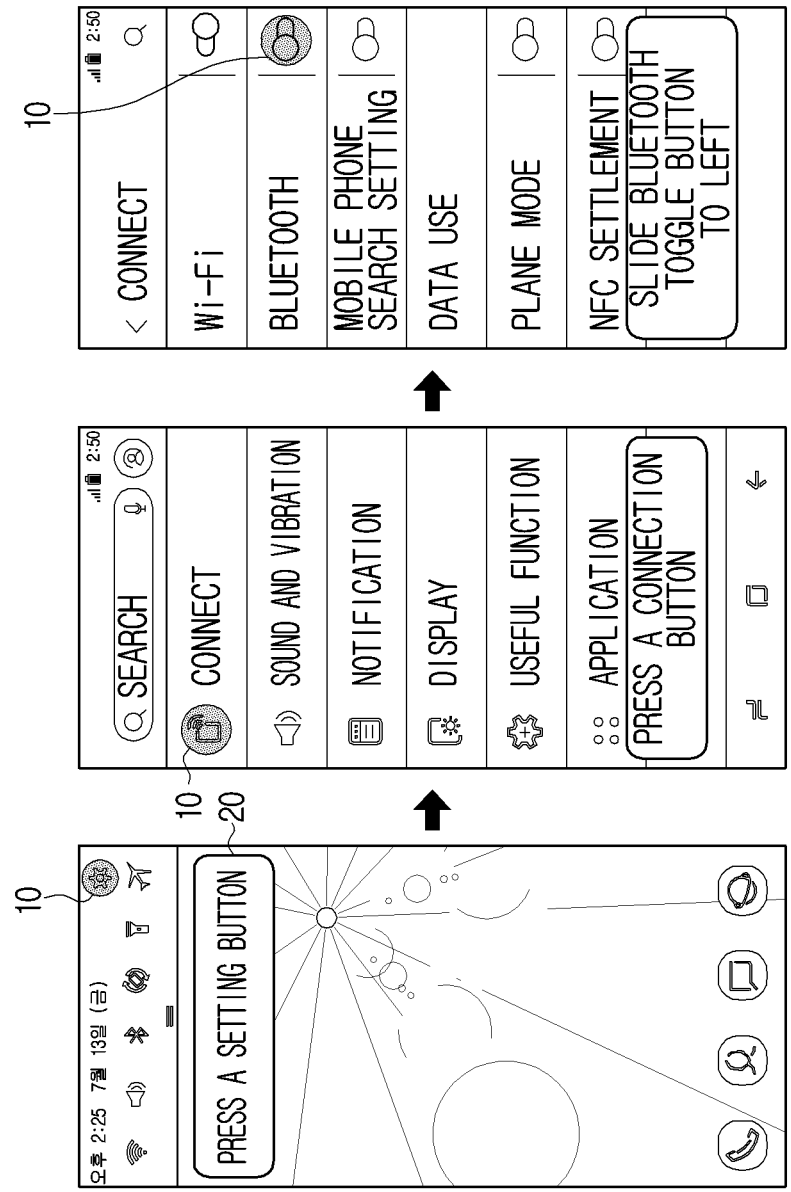
FIG. 5 is a diagram illustrating example current setting information according to an embodiment.

FIG. 5 is a diagram illustrating example current setting information according to an embodiment.

Referring to FIG. 5, the processor 120 according to an embodiment may identify at least one pre-performed operation information among the plurality of operation information obtained by dividing a text in operation units of the electronic apparatus 100 based on the current setting state information.

For example, the text "Press a connection button on a setting screen→Slide a Wi-Fi toggle button to the left" and "Press a connection button on a setting screen→Slide a Bluetooth toggle button to the left" corresponding to the user input (turn on Wi-Fi and Bluetooth) may be obtained.

The processor 120 may divide the obtained text into operation units to obtain a setting button, a connection button, a Wi-Fi toggle button, and a Bluetooth toggle button as a plurality of operation information. The processor 120 according to an embodiment may identify previously performed operation information among the plurality of operation information based on the current setting state information of the electronic apparatus 100. As an example, if the screen being provided through the display 110 is a setting screen, the processor 120 may identify that an operation of touching a setting button is previously performed. In this example, the processor 120 may exclude the setting button from among the plurality of operation information and then obtain the sequence information based on the remaining operation information. As another example, when it is identified that the Wi-Fi function of the electronic apparatus 100 is turned on, based on the current setting state information, the processor 120 may exclude the Wi-Fi toggle button from the plurality of operation information and obtain the sequence information based on the remaining operation information.

Even though the user input is "Turn on Wi-Fi and Bluetooth" in the same manner, referring to FIG. 5, the processor 120 may not provide a UI for guiding a touch input for the Wi-Fi toggle button that is determined as the pre-performed operation information, unlike the example illustrated in FIG. 4, and may provide a UI for guiding a touch input for a Bluetooth toggle button.

Figure 6:
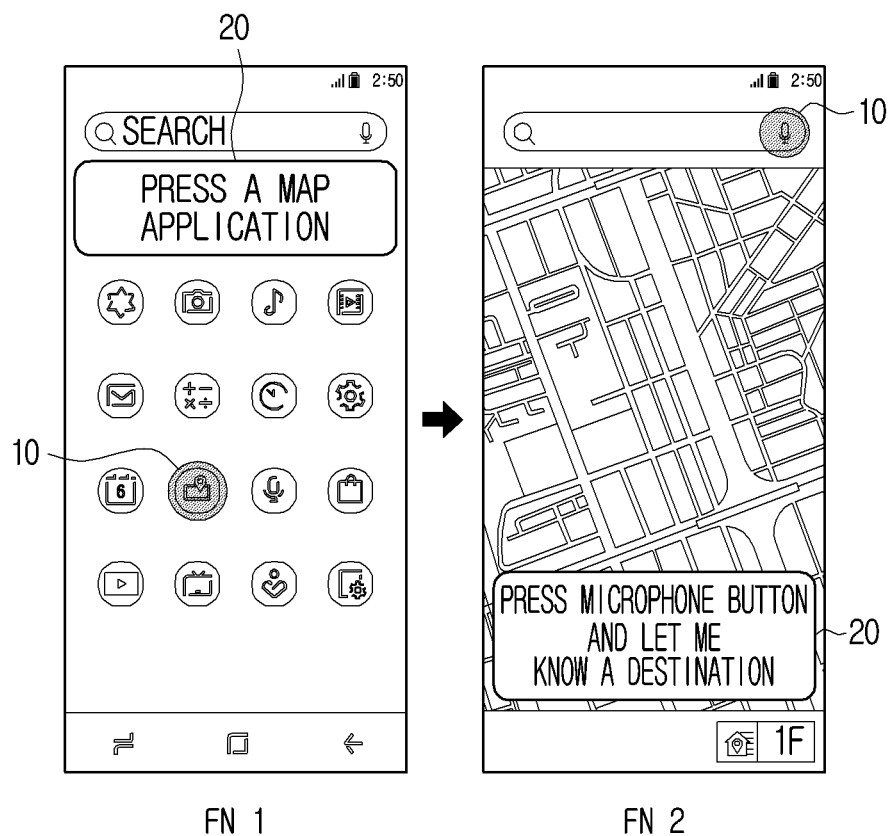
FIG. 6 is a diagram illustrating example current setting state information according to another embodiment.

FIG. 6 is a diagram illustrating current setting state information according to another embodiment.

The processor 120 according to various embodiments may identify a question based on a user input and obtain text (for example, an answer) corresponding to the question.

Referring to FIG. 6, if the user input is "Let me know how to use a navigation", the processor 120 may obtain one question and answer which are determined to be the closest to the user among the plurality of questions having navigation as a keyword based on the MRC model. Here, the keyword does not necessarily mean that the word should be included in the question or answer. For example, the processor 120 may obtain one question corresponding to a user input and an answer corresponding to the question among a plurality of questions for each subject.

Referring to FIG. 6, the processor 120 according to an embodiment may obtain the text "Press a map application-→press a microphone button and let me know a destination" corresponding to "Let me know how to use a navigation" which is a user input. The processor 120 may then obtain sequence information for sequentially inducing the touch input for the map application Fn1 and microphone button Fn2 and provide the guide UI 10 and the script 20 based on the sequence information.

The processor 120 according to another embodiment may obtain sequence information including additional operation information based on the current setting state information of the electronic apparatus 100. The additional operation information may mean another operation information, other than plurality of operation information obtained by dividing a text in an operation unit. This will be described in greater detail below with reference to FIG. 7.

Figure 7:
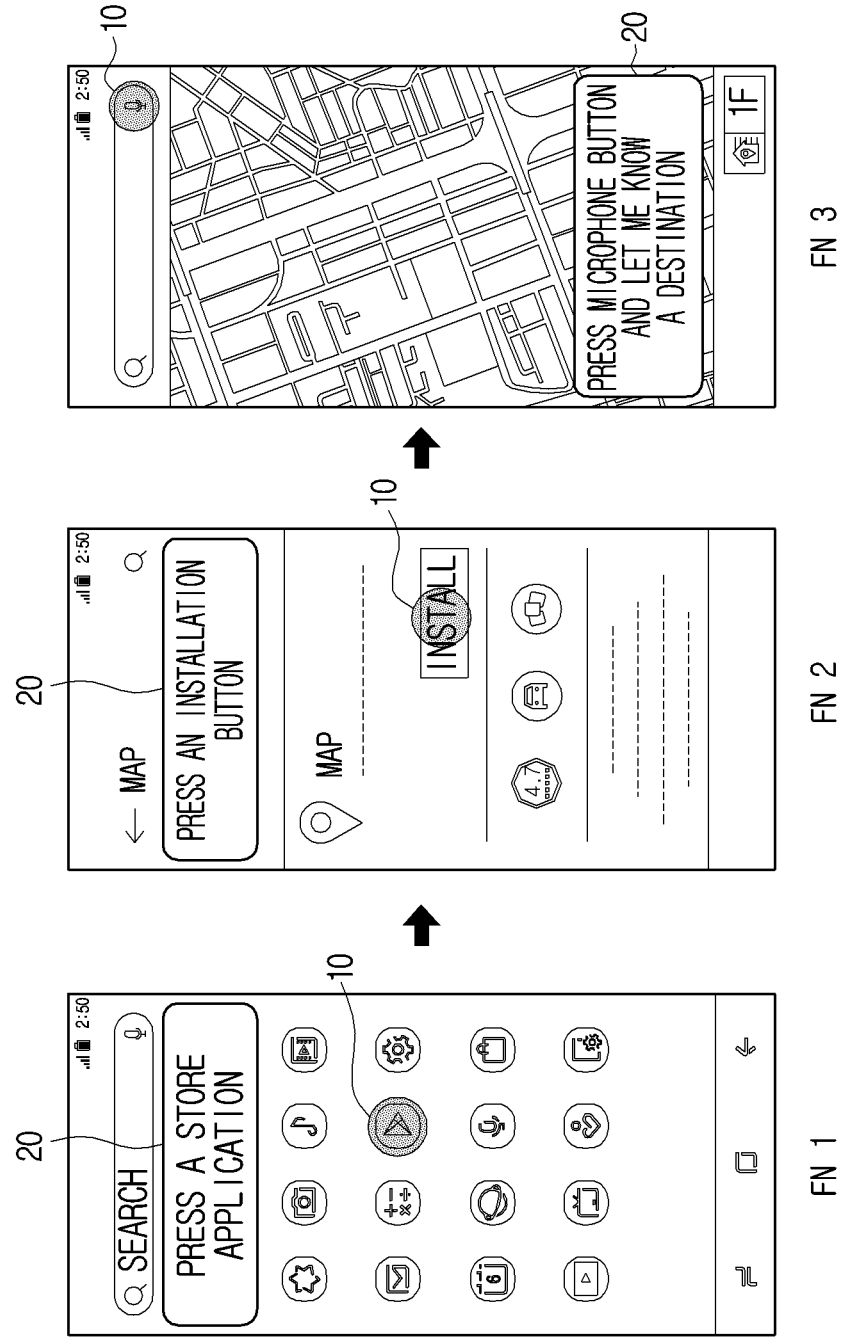
FIG. 7 is a diagram illustrating example additional operation information according to another embodiment.

FIG. 7 is a diagram illustrating example additional operation information according to another embodiment.

Referring to FIG. 7, the processor 120 may obtain additional operation information required to execute a function corresponding to the text in addition to the plurality of operation information based on the current setting state information. For example, the processor 120 may obtain sequence information for sequentially inducing a touch input for the map application Fn1 and a microphone button Fn2. According to an example embodiment, the processor 120 may identify whether the map application is installed based on the current setting state information, in order to perform "Please press a map application→press a microphone button and let me know a destination" which is the text corresponding to the user input. As another example, the processor 120 may identify whether the electronic apparatus 100 includes a microphone.

According to an embodiment, if it is identified that the map application is not installed on the electronic apparatus 100 based on the current setting state information, the processor 120 may obtain operation information for installing the map application in addition to the plurality of operation information (for example, the map application Fn1 and the microphone button Fn2) as additional operation information. The processor 120 may then obtain sequence information based on the plurality of operation information and additional operation information.

Even if the user input is "Let me know how to use navigation" in the same manner, referring to FIG. 7, the processor 120 may additionally provide a guide UI 10 for inducing a touch input to press a store button and a guide UI 10 for inducing a touch input for installing a map application, unlike the example illustrated in FIG. 6.

As another example, the processor 120 according to an embodiment may obtain additional operation information required to execute a function corresponding to the text in addition to the plurality of operation information based on the current setting state information. In an example, the processor 120 may identify additional actions required so that the electronic apparatus 100 operates to correspond to the user input, in the current setting state information. For example, if the user input is a "Let me know how to use a navigation," the processor 120 may obtain the map application Fn1 and the microphone button Fn2 as operation information. The processor 120 may then identify whether the electronic apparatus 100 is in a suitable state for executing the map application Fn1 based on the current setting state information of the electronic apparatus 100. For example, if a global positioning system (GPS) function of the electronic apparatus 100 is turned off, the processor 120 may obtain an operation Fn 1-1 (not shown) to turn on the GPS based on the MRC model.

The processor 120 according to an embodiment may identify sub-operations for each operation. As described above, a sub-operation corresponding to the operation Fn1 for executing the map application may include an operation Fn 1-1 for turning on the GPS function and an operation Fn 1-2 (not shown) for identifying by the map application a current location of the electronic apparatus 100, and the like. The processor 120 may then identify at least one sub-operation of the plurality of sub-operations as additional operational information based on the current setting state information of the electronic apparatus 100. The processor 120 may then obtain sequence information based on the plurality of operation information and additional operation information. For example, if the GPS function is turned off, the processor 120 may obtain the operation Fn 1-1 for turning on the GPS function as additional operation information, in addition to the operation Fn1 for executing the map application based on the text corresponding to the user input "Let me know how to use Navigation" and the operation Fn2 for inducting utterance of a destination. The processor 120 may provide a guide UI corresponding to each operation in the order of Fn1→Fn 1-1→Fn2.

As another example (not shown), the processor 120 according to an example embodiment may identify additional operations that need to be performed prior to performing one operation of a plurality of operations. For example, if the user input text is "Let me know how to use a dictionary function," the processor 120 may obtain pressing a search word Fn1, pressing a dictionary in an option list F2, and checking a search result Fn3 as plurality of operation information. The processor 120 may identify "installing a dictionary application Fn 2-1" as an additional operation that needs to be performed in advance to perform the pressing a dictionary Fn2 in the option list. The sequence information may then be adjusted such that the identified additional operations are placed in advance. For example, the guide UI corresponding to each operation may be provided in the order of pressing a search word Fn1→installing a dictionary application Fn 2-1→ pressing a dictionary in an option list Fn2→checking a search result Fn3 based on the operation information and additional operations. The processor 120 according to an embodiment may not include the preceding operation in the sequence information based on the current setting state information of the electronic apparatus 100. For example, if it is identified that the dictionary application is already installed based on the current setting state information, the processor 120 may generate the sequence information such that the installing a dictionary application Fn 2-1 is not added before pressing a dictionary Fn2 in the option list.

As a still another embodiment (not shown), the processor 120 according to an embodiment may perform some operations by itself on a background state without providing a guide UI. For example, when the user input is "Let me know how to use a dictionary," the processor 120 may obtain pressing a search word Fn1→installing a dictionary application Fn2-1→pressing a dictionary in an option list Fn2→checking a search result Fn3 as sequence information based on operation information and an additional operation on the basis of the text corresponding thereto. In this example, the processor 120 may install a dictionary application by the processor 120 itself in a background state, instead of providing a guide UI corresponding to installing a dictionary application Fn 2-1, which is a preceding operation. In this example, the guide provided to a user may be in the order of Fn1→Fn2→Fn3.

Figure 8:
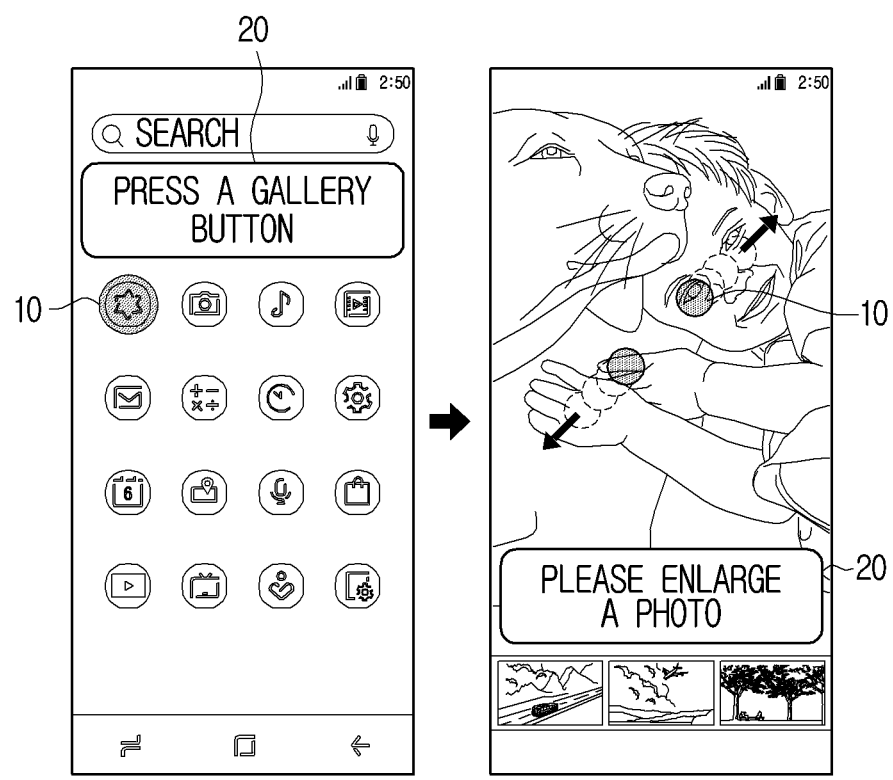
FIG. 8 is a diagram illustrating an example guide UI according to an embodiment.

FIG. 8 is a diagram illustrating an example guide UI according to an embodiment.

The guide UI according to an embodiment may guide a position of a user's touch input and guide a touch type. For example, the processor 120 may identify a touch type required to perform any one operation information among plurality of operation information obtained by performing the NLP on the obtained text.

For example, as shown in FIG. 8, the user input may be "how to enlarge a photo?" and the processor 120 may obtain a text corresponding to the user input, "Press a screen by two fingers and spread outward to adjust a screen magnification ratio." In this example, the processor 120 may provide the guide UI 10 for guiding a spread touch input. As illustrated in FIG. 8, the processor 120 may provide the guide UI 10 including an animation effect as if a first object and a second object included in the guide UI 10 are spaced apart from each other.

As a still another example, when the user input is "How to enlarge a screen?", the processor 120 may obtain a text corresponding to the user input, "You can enlarge a screen by rapidly pressing a target screen area three times." In this example, the processor 120 may provide a guide UI 10 including an animation effect as if a tap touch input of three times is performed in one area of a screen. This is merely an example and is not limited thereto.

The processor 120 according to an embodiment may provide a UI for selecting one of a manual mode or an automatic mode. When the user's touch input is received according to the guide UI 10, the manual mode may provide the guide UI 10 corresponding to the operation information of the next sequence based on the sequence information. The automatic mode may be a mode for changing the context of the electronic apparatus 100 according to the obtained text, even if the user's touch input corresponding to the guide UI 10 is not received.

For example, when a user's touch input is not received in the automatic mode, the processor 120 may perform a touch input function corresponding to the guide UI 10, and provide a visual feedback indicating that a touch input function is performed. For example, the processor 120 may change a context of the electronic apparatus 100 and provide a guide UI 10 corresponding to the next operation information based on the sequence information, at the same time of providing an animation effect as if a touch input for the guide UI 10 is received.

The embodiment is not necessarily limited thereto. For example, the processor 120 may sequentially change the context of the electronic apparatus 100 based on the sequence information in the background without changing the screen provided through the display 110. For example, if the text corresponding to the user input is "Drag on an adjustment bar in +direction to brighten up a screen," a UI for guiding the drag touch input may be provided (for example, manual mode) and the processor 120 may adjust the brightness of the screen by itself with background (for example, automatic mode).

Returning to FIG. 1, the processor 120 according to an embodiment may, if it is identified that at least one of the position or touch type of the user's touch input does not correspond to the guide UI 10, provide at least one of a visual feedback or a sound feedback. This will be described in greater detail below with reference to FIG. 9.

Figure 9:
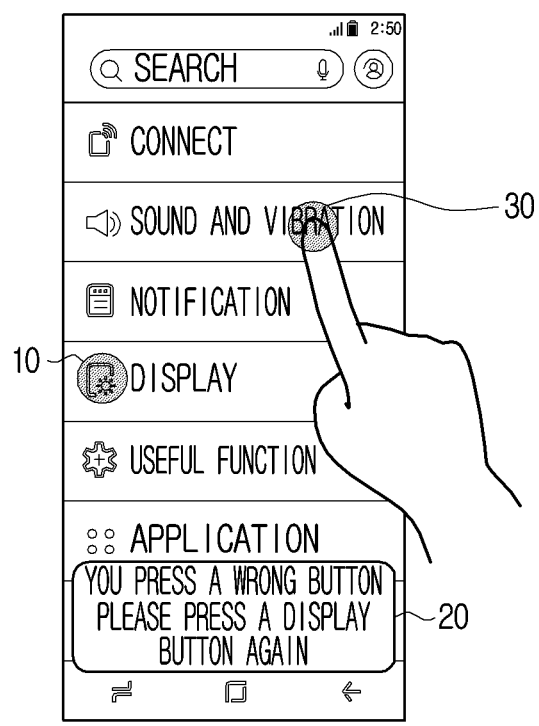
FIG. 9 is a diagram illustrating example feedback according to an embodiment.

FIG. 9 is a diagram illustrating example feedback according to an embodiment.

When it is identified that a position 30 of the user's touch input corresponds to the guide UI 10, the processor 120 according to an embodiment may sequentially provide the guide UI 10 corresponding to the next operation information based on the sequence information.

As another example, if it is identified that a position 30 of the user's touch input does not correspond to the guide UI 10, the processor 120 may provide a feedback to induce to perform a touch input again. Referring to FIG. 9, the processor 120 may provide at least one of visual feedback or sound feedback when the location 30 of the user's touch input corresponds to sound and vibration, although the guide UI 10 induces a tap touch input to the display according to an embodiment. The visual feedback may be feedback that changes at least one of the size or color of the guide UI 10. However, this is merely an example and various types of visual feedback may be provided.

The sound feedback according to an example embodiment may include sound effects, beeps, or the like. As another example, the sound feedback may be feedback that outputs as the sound signal based on the script 20 corresponding to the guide UI 10. For example, referring to FIG. 9, the processor 120 may provide sound feedback to output a "You press a wrong button please press a display button again" as the sound signal.

Returning to FIG. 1, the electronic apparatus 100 according to an example embodiment may further include a communicator (e.g., including communication circuitry) (not shown), and the processor 120 may control the communicator to transmit a user input to the server. The processor 120 may then obtain a plurality of operational information and sequence information based on the text if the text corresponding to the user input is received from the server. The text may be obtained based on the manual and the MRC model of the electronic apparatus 100. A detailed description of this will be provided below with reference to FIG. 10.

Figure 10:
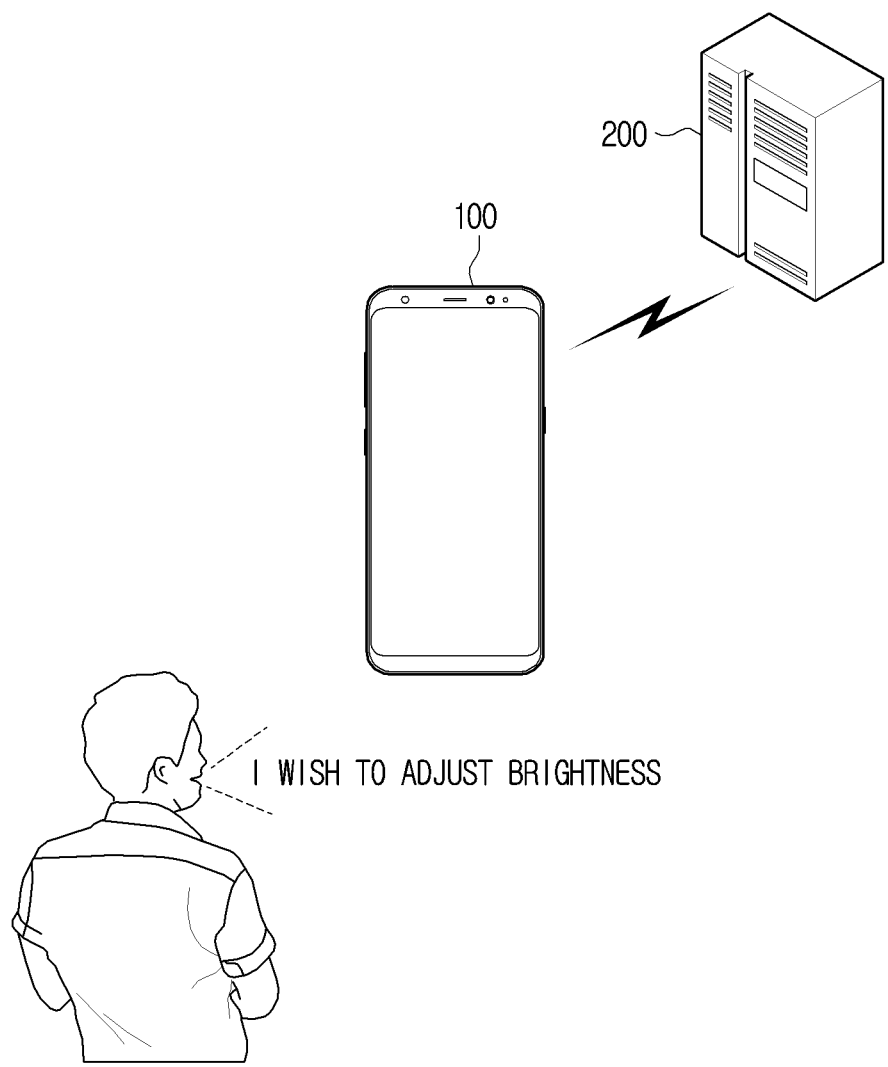
FIG. 10 is a diagram illustrating an example electronic apparatus communicating with a server according to an embodiment.

FIG. 10 is a diagram illustrating an example electronic apparatus communicating with a server according to an embodiment.

Referring to FIG. 10, the electronic apparatus 100 may communicate with a server 200. The processor 120 may transmit a user input to the server 200 and receive a text corresponding to the user input from the server 200. The server 200 may include a plurality of question and answer datasets according to the MRC model based on a document, a manual, or an instruction manual of the electronic apparatus 100, but this is merely an example, and the question and the answer corresponding to the question are not necessarily present in one pair. For example, the server 200 may obtain a keyword, a subject matter, or the like, by performing the NLP on the user input, and obtain text (or answer) corresponding to the user input from the search result based on the obtained keyword, subject, or the like.

Figure 2:
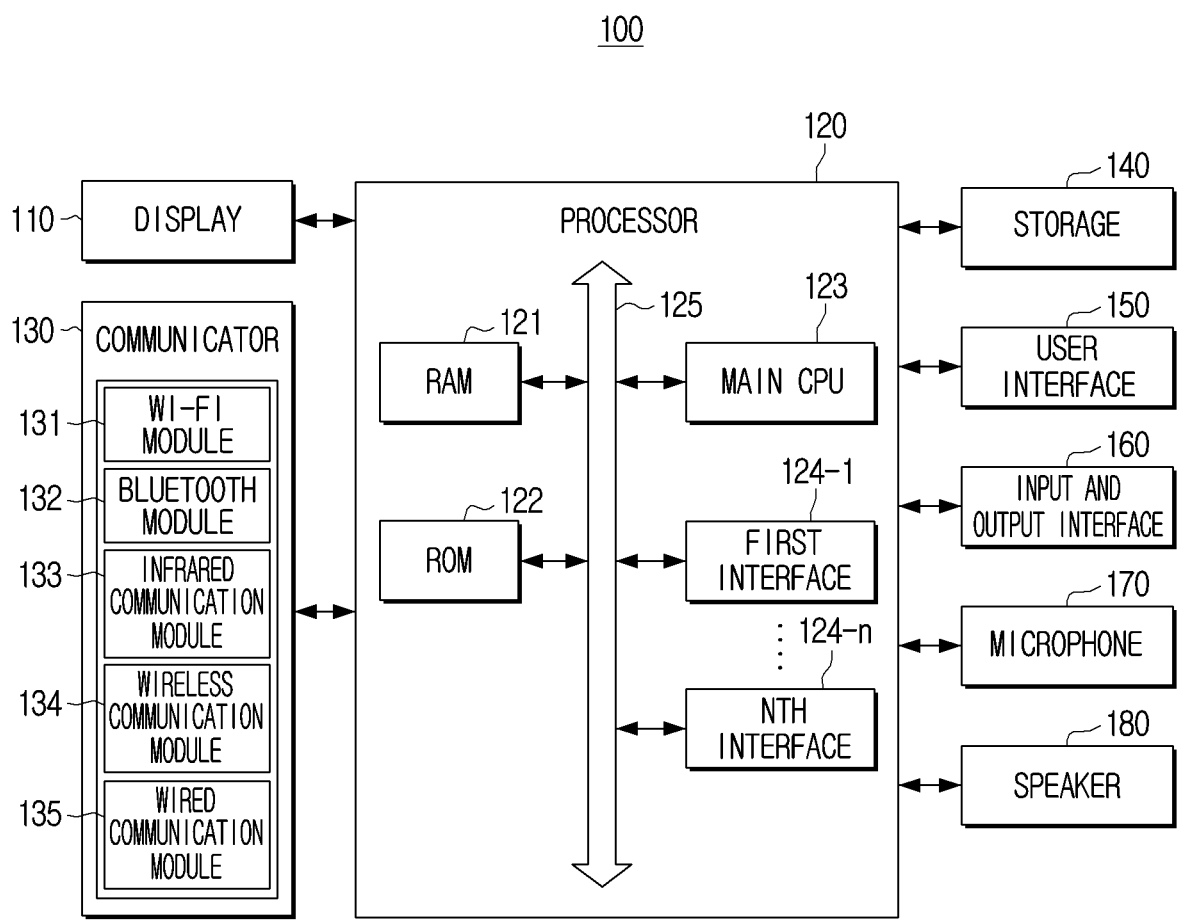
FIG. 2 is a block diagram illustrating an example configuration of the example electronic apparatus illustrated in FIG. 1 according to an embodiment.

FIG. 2 is a block diagram illustrating an example configuration of the example electronic apparatus of FIG. 1 according to an embodiment.

Referring to FIG. 2, the electronic apparatus 100 according to an embodiment may include the display 110, the processor (e.g., including processing circuitry) 120, the communicator (e.g., including communication circuitry) 130, a storage 140, a user interface (e.g., including user interface circuitry) 150, an input and output interface (e.g., including input and output circuitry) 160, a microphone 170, and a speaker 180. The configurations of FIG. 2 overlapping with the configurations of FIG. 1 will not be further described.

The processor 120 may include various processing circuitry and controls overall operations of the electronic apparatus 100 using various programs stored in the storage 140.

The processor 120 includes a random access memory (RAM) 121, read-only memory (ROM) 122, a main CPU 123, first to $n^{th}$ interfaces 124-1 to 124-N, and bus 135.

Here, the RAM 121, ROM 122, the main CPU 123, the first to $n^{th}$ interface 124-1 to 124-N, or the like, may be interconnected through the bus 125.

The ROM 122 stores a command set for booting the system and the like. When the turn-on command is input and power is supplied, the main CPU 133 copies the O/S stored in the storage 140 to the RAM 121 according to the instruction stored in the ROM 132, executes O/S to boot the system. When the booting is completed, the main CPU may copy various programs stored in the memory to the RAM 121, execute programs copied to the RAM 121, and perform various operations.

The main CPU 123 accesses the storage 140 and performs booting using an operating system (OS) stored in the storage 140. In addition, the CPU 123 performs various operations using various programs, or the like, stored in the storage 140.

The first to $n^{th}$ interface 124-1 to 124-$n$ are connected to the various elements described above. One of the interfaces may be a network interface connected to an external device through the network.

The processor 120 may perform a graphic processing function (video processing function). For example, the processor 120 may generate a screen including various objects such as icons, images, text, and the like using a calculator (not shown) and a renderer (not shown). Herein, a calculator (not shown) may calculate an attribute value such as a coordinate value, a shape, a size, and a color to be displayed by each object according to the layout of the screen based on the received control command. A renderer (not shown) may generate display screens of various layouts including objects based on the attribute value calculated by the calculator (not shown). The processor 120 may perform various image processing such as decoding, scaling, noise filtering, frame rate conversion, resolution conversion, or the like, for the video data.

The processor 120 may perform processing of audio data. For example, the processor 120 may perform various image processing such as, for example, and without limitation, decoding, amplifying, noise filtering, and the like, on the audio data.

The communicator 130 may include various communication circuitry and is configured to communicate with other external devices in various types according to various communication types. The communication interface 130 includes various modules, each including various communication circuitry, such as, for example, and without limitation, a Wi-Fi module 131, a Bluetooth module 132, an infrared communication module 133, a wireless communication module 134, a wired communication module 135, or the like. Each communication module may be implemented as at least one hardware chip format.

The processor 120 may communicate with various external devices using the communicator 130. The external device may include, for example, and without limitation, a display device such as a TV, an image processing device such as a set-top box, an external server, a control device such as a remote control, an audio output device such as a Bluetooth speaker, a lighting device, a smart cleaner, a home appliance such as a smart refrigerator, a server such as an Internet of things (TOT) home manager, or the like.

The Wi-Fi module 131 and the Bluetooth module 132 perform communication using Wi-Fi method and Bluetooth method, respectively. When using the Wi-Fi module 131 or the Bluetooth module 132, various connection information such as a service set identifier (SSID) and a session key may be transmitted and received first, and communication information may be transmitted after communication connection.

The infrared ray communication module 133 performs communication according to infrared data association (IrDA) technology that transmits data wireless to local area using infrared ray between visible rays and millimeter waves.

The wireless communication module 134 may refer, for example, to a module performing communication according to various communication standards such as Zigbee, $3^{rd}$ generation (3G), 3rd generation partnership project (3GPP), long term evolution (LTE), LTE advanced (LTE-A), 4th generation (4G), 5th generation (5G), or the like, in addition to the Wi-Fi module 131 and the Bluetooth module 132 described above.

The communicator 130 may include at least one of a local area network (LAN) module, Ethernet module, or wired communication module performing communication using a pair cable, a coaxial cable, an optical cable, or the like.

According to an embodiment, the communicator 130 may use the same communication module (for example, Wi-Fi module) to communicate with an external device such as a remote controller and an external server.

In accordance with another example, the communicator 130 may utilize different communication modules (for example, Wi-Fi modules) to communicate with an external device such as a remote controller and an external server. For example, the communication interface 130 may use at least one of an Ethernet module or a Wi-Fi module to communicate with an external server, and may use a Bluetooth (BT) module to communicate with an external device such as a remote controller. However, this is merely an example, and the communicator 130 may use at least one communication module among various communication modules when communicating with a plurality of external devices or an external server.

The electronic apparatus 100 may further include a tuner and a demodulator according to an example.

The tuner (not shown) may receive a radio frequency (RF) broadcasting signal by tuning a channel selected by a user or all the prestored channels, from among RF broadcasting signals that are received through the antenna.

A demodulator (not shown) may receive and demodulate a digital intermediate frequency (DIF) signal that is converted by the tuner, and perform channel decoding, or the like.

The storage 140 may be implemented as an internal memory such as the ROM (for example, electrically erasable programmable read-only memory (EEPROM)), RAM, or the like, included in the processor 120, or a memory separate from the processor 130. In this case, the storage 140 may be implemented as a memory type embedded in the electronic apparatus 100 according to a data storage use, or a memory type detachable from the electronic apparatus 100. For example, the data for driving the electronic apparatus 100 may be stored in a memory embedded in the electronic apparatus 100, and the data for expansion of the electronic apparatus 100 may be stored in a memory detachable from the electronic apparatus 100. A memory embedded in the electronic apparatus 100 may be a volatile memory such as, for example, and without limitation, a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive, a solid state drive (SSD), or the like. In the case of a memory detachably mounted to the electronic apparatus 100, the memory may be implemented as, for example, and without limitation, a memory card (for example, a compact flash (CF), secure digital (SD), micro secure digital (micro-SD), mini secure digital (mini-SD), extreme digital (xD), multi-media card (MMC), etc.), an external memory (for example, a USB memory) connectable to the USB port, or the like.

The user interface 150 may include various user interface circuitry and be implemented as a device such as, for example, and without limitation, a button, a touch pad, a mouse, and a keyboard, or implemented as a touch screen which is capable of performing the aforementioned display function and a manipulation input function as well. The button may be various types of buttons such as a mechanical button, a touch pad, a wheel, and the like formed in an arbitrary area such as a front surface portion, a side surface portion, and a back surface portion of the main body of the electronic apparatus 100.

The input and output interface 160 may include various input/output circuitry and be at least one interface among, for example, and without limitation, high definition multimedia interface (HDMI), mobile high definition link (MHO, universal serial bus (USB), display port (DP), Thunderbolt, video graphics array (VGA) port, RGB port, d-subminiature (D-SUB), digital visual interface (DVI), and the like.

The input and output interface 160 may input and output at least one of a voice signal and a video signal.

According to an embodiment, the input and output interface 160 may include a port for inputting and outputting only a voice signal and a port for inputting and outputting only a video signal as separate ports, or may be implemented as one port for inputting and outputting both a voice signal and a video signal.

The electronic apparatus 100 may be implemented as an apparatus not including a display and transmit a video signal to a separate display device.

The electronic apparatus 100 may receive a user voice signal from an external device including a microphone. In this example, the received user voice signal may be a digital voice signal, but according to an embodiment, the signal may be an analog voice signal. For example, the electronic apparatus 100 may receive a user voice signal through a wireless communication method such as Bluetooth or Wi-Fi method. The external device may be implemented as a remote control device or a smartphone.

The electronic apparatus 100 may transmit the corresponding voice signal to an external server for voice recognition of the voice signal received from an external device.

A communication module for communicating with the external device and the external server may be implemented separately. For example, communication with the external device may be performed through a Bluetooth module, and communication with the external server may be performed through the Ethernet modem or the Wi-Fi module.

The electronic apparatus 100 according to an embodiment may transmit a received digital voice signal to a voice recognition server. In this case, the voice recognition server may convert the user input into text information using a speech to text (STT). The voice recognition server may transmit text information to another server or an electronic apparatus to perform a search corresponding to the text information, and in some cases, perform a direct search.

The electronic apparatus 100 according to another embodiment may apply a speech to text (STT) function directly to a user input to convert to text information, and transmit the converted text information to an external server.

The electronic apparatus 100 may further include a microphone 170. The microphone 170 may refer, for example, to an element to receive a user voice or other sound and convert the received sound to audio data.

The microphone 170 may receive the user voice in an active state. For example, the microphone 170 may be integrally formed as an integral unit on an upper side, a front side direction, a side direction, or the like of the electronic apparatus 100. The microphone may include various configurations such as a microphone for collecting user voice in an analog format, an amplifier circuit for amplifying the collected user voice, an audio-to-digital (A/D) conversion circuit for sampling the amplified user voice to convert into a digital signal, a filter circuitry for removing a noise element from the converted digital signal, or the like.

According to another embodiment, the electronic apparatus 100 may receive a user voice from an external device (not shown) having a microphone. For example, the external device may be implemented with a remote control device (remote controller) including, but not limited to, a microphone. When the remote control device (remote controller) receives an analog voice signal of the user through the microphone, the remote control device (remote controller) may convert the analog voice signal into a digital voice signal. The remote control device (remote controller) may transmit the converted digital voice signal to the electronic apparatus 100 using at least one of infrared, Wi-Fi, or Bluetooth communication. When the digital voice signal is received from the external device, the electronic apparatus 100 may perform voice recognition on the basis of the received digital voice signal, and perform a control operation based on the voice recognition result. According to another embodiment, the remote control device (remote controller) may perform a voice recognition operation on the digital voice signal, and transmit information corresponding to the voice recognition result to the electronic apparatus 100. The information corresponding to the speech recognition result may be at least one of a voice recognition result itself or a control command corresponding to the voice recognition result.

According to still another embodiment, the external device may be implemented as a smartphone including a microphone. In this example, the smartphone may remotely control the electronic apparatus 100 using a remote control application for performing a pre-installed remote control function.

A smartphone may convert an analog voice signal into a digital voice signal if an analog voice signal of a user is received through a microphone. In this example, the smartphone can perform voice recognition on the digital voice signal using a voice recognition application. Here, the voice recognition application may be the same as or different from the remote control application described above. When voice recognition for a digital voice signal is performed, the smartphone can remotely control the electronic apparatus 100 using a remote control application based on the voice recognition result. According to another embodiment, the smartphone may transmit the converted digital voice signal to the electronic apparatus 100 using at least one of an infrared ray, a Wi-Fi, or a Bluetooth communication method. In this case, when the digital voice signal is received from the external device, the electronic apparatus 100 may perform voice recognition on the basis of the received digital voice signal and perform a control operation based on the voice recognition result.

The speaker 180 may be configured to output various notification sounds or a voice message as well as various audio data processed by the input and output interface 160.

Figure 11:
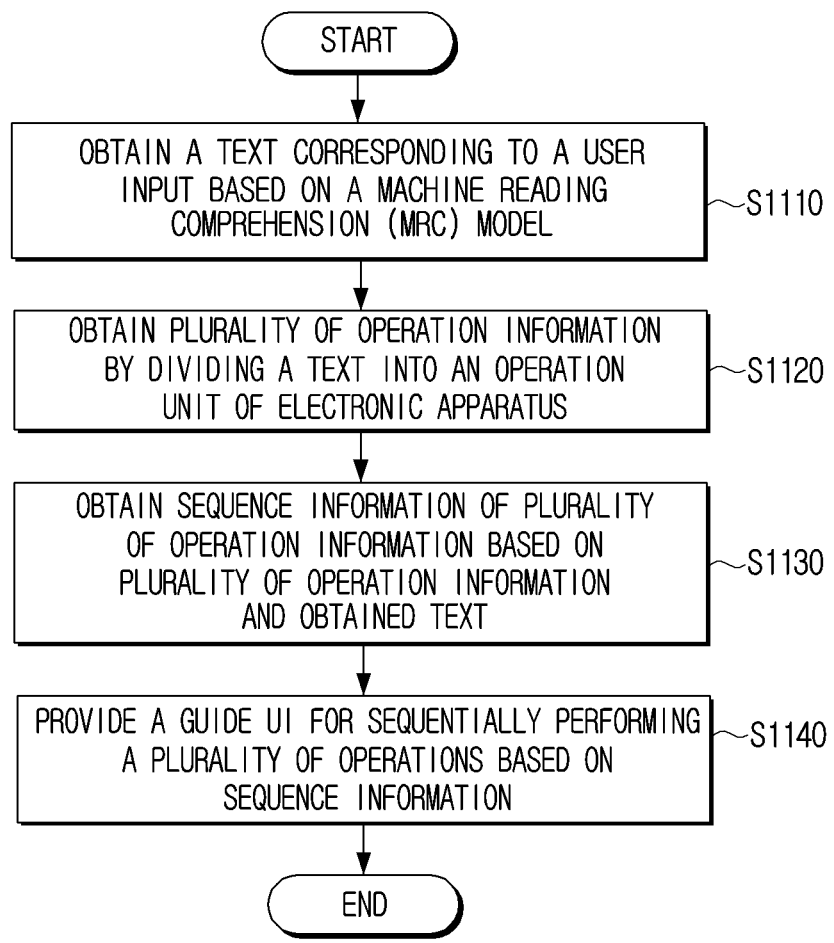
FIG. 11 is a flowchart illustrating an example method for controlling an electronic apparatus according to an embodiment.

FIG. 11 is a flowchart illustrating an example method for controlling an electronic apparatus according to an embodiment.

A method of controlling an electronic apparatus according to an embodiment obtains a text corresponding to a user input based on a machine reading comprehension (MRC) model in operation S1110.

By dividing a text in an operation unit of an electronic apparatus, a plurality of operation information is obtained in operation S1120.

Sequence information of a plurality of operation information is obtained based on the plurality of operation information and the obtained text in operation S1130.

A guide UI for sequentially performing a plurality of operations based on the sequence information is provided in operation S1140.

Herein, an operation unit may refer, for example, to a unit based on a context which requires a user's touch input.

A method of controlling an electronic apparatus according to an example embodiment may include an operation of obtaining current setting state information of an electronic apparatus, and the operation of obtaining sequence information in operation S1130 may include identifying at least one operation information previously performed in the electronic apparatus among a plurality of operation information based on the current setting state information; and obtaining sequence information based on the remaining operation information except the identified operation information.

According to an example embodiment, the method may include obtaining current setting state information of the electronic apparatus; and obtaining additional operation information required to execute a function corresponding to the obtained text in addition to the plurality of operation information based on the current setting state information, and the step of obtaining sequence information in operation S1130 may include obtaining sequence information based on a plurality of operation information and additional operation information.

The operation of providing the guide UI in operation S1140 may include providing a first guide UI based on information related to a touch input required to perform first operation information among a plurality of operation information according to sequence information; and providing a second guide UI based on information related to a touch input required to perform second operation information of the plurality of operation information based on the changed context and sequence information when the context of the electronic apparatus is changed based on the touch input corresponding to the first guide UI.

The information related to the touch input may include at least one of the position or touch type of the touch input.

The MRC model according to an embodiment may include the QG model for obtaining a question by performing the NLP based on a plurality of sentences included in the manual of the electronic apparatus and the QA model for obtaining an answer corresponding to the obtained question.

The operation of obtaining a text in operation S1110 may include transmitting a user input to a server, and the text may be obtained based on the manual and the MRC model of the electronic apparatus.

The method according to an embodiment may, based on identifying that at least one of the position nor touch type of the touch input of the user not corresponding to the guide UI, include providing at least one of a visual feedback or a sound feedback.

The methods according to various example embodiments as described above may be implemented as an application format which may be installed in an electronic apparatus.

The methods according to various example embodiments as described above may be implemented by software upgrade and/or hardware upgrade for the electronic apparatus.

The various example embodiments as described above may be performed through an embedded server provided in the electronic apparatus or an external server of the electronic apparatus.

According to the disclosure, various example embodiments as described above may be implemented with software including instructions stored in the machine-readable storage media readable by a machine (e.g., computer). According to various example embodiments, an apparatus may call instructions from the storage medium and operate according to the called instructions, and may include an electronic apparatus (e.g., electronic apparatus A). When an instruction is executed by a processor, the processor may perform functions corresponding to the instruction, either directly or under the control of the processor, using other components. The instructions may include a code made by a compiler or a code executable by an interpreter. A machine-readable storage medium may be provided in the form of a non-transitory storage medium.

According to various example embodiments of the disclosure, a method may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™). In the case of on-line distribution, at least a portion of the computer program product may be stored temporarily or at least temporarily in a storage medium such as a manufacturer's server, a server of an application store, or a memory of a relay server.

Each of the elements (for example, a module or a program) according to various example embodiments may include a single entity or a plurality of entities, and some sub-elements of the abovementioned sub-elements may be omitted, the elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order, omitted, or other operations may be added.

While various embodiments have been illustrated and described with reference to the drawings, the disclosure is not limited to the example embodiments or the drawings, and it will be understood by those of ordinary skill in the art that various changes in form and details may be made therein without departing from the spirit and scope including, for example, the following claims and their equivalents.

What is claimed is:

1. An electronic apparatus comprising:
a display; and
a processor configured to control the electronic apparatus to:
receive a user input;
obtain a response text related to the user input, based on a machine reading comprehension (MRC) model;
obtain information about a plurality of operations for controlling the electronic apparatus from the response text, wherein the plurality of operations are required to complete a function corresponding to the obtained response text, and wherein the information comprises sequence information indicating an order of the plurality of operations;
obtain information about a current setting state of the electronic apparatus, the current setting state of the electronic apparatus including at least information about one or more applications installed in the electronic apparatus and a screen being displayed through the display;
identify a sub-operation for each of the plurality of operations required to complete the function corresponding to the obtained response text that is not included in the plurality of operations;
based on the information about the current setting state of the electronic apparatus and one or more operations pre-performed in the electronic apparatus before the user input is received, identify at least one of the identified sub-operations as additional operational information required to complete the function corresponding to the obtained response text and update the plurality of operations to include one or more additional operations corresponding to the additional operational information and the sequence information indicating the order of the updated plurality of operations; and
control the display to provide a guide user interface (UI) to sequentially perform the updated plurality of operations comprising the one or more additional operations based on the updated sequence information, wherein the guide UI comprises a UI to perform the updated plurality of operations based on information related to a touch input to execute the updated plurality of operations.

2. The electronic apparatus of claim 1, wherein the processor is further configured to divide the response text by a unit of operation based on a context requiring a touch input.

3. The electronic apparatus of claim 1, wherein the processor is further configured to control the electronic apparatus to:
obtain an additional operation required to complete the function, in addition to the updated plurality of operations.

4. The electronic apparatus of claim 3, wherein the processor is further configured to control the electronic apparatus to:
provide the guide UI based on information related to a touch input required to execute a first operation of the updated plurality of operations,
based on a context of the electronic apparatus being changed based on the touch input by a user corresponding to the guide UI, control the display to provide a next guide UI based on information related to a touch input required to execute the additional operation.

5. The electronic apparatus of claim 4, wherein the information related to the touch input comprises at least one of a position or a touch type of the touch input.

6. The electronic apparatus of claim 1, wherein the MRC model comprises a question generation (QG) model to obtain a question and a question answer (QA) model to obtain an answer corresponding to the obtained question by performing a natural language processing (NLP) based on a plurality of sentences included in a manual of the electronic apparatus.

7. The electronic apparatus of claim 1, further comprising:
a communicator comprising communication circuitry,
wherein the processor is further configured to control the electronic apparatus to:
control the communicator to transmit the user input to a server, and
based on receiving the response text corresponding to the user input from the server, obtain the plurality of operations based on the received response text, and
wherein the obtained response text is based on a manual and the MRC model of the electronic apparatus.

8. The electronic apparatus of claim 1, wherein the processor is further configured to control the electronic apparatus to, based on an identification that at least one of a position or a touch type of a touch input when the guide UI is displayed not corresponding to the guide UI, provide at least one of a visual feedback or a sound feedback.

9. The electronic apparatus of claim 1, wherein the processor is further configured to control the electronic apparatus to:
provide a UI for selecting any one of a manual mode or an automatic mode, and
based on the automatic mode being selected, sequentially perform the updated plurality of operations by performing a touch input function corresponding to the guide UI.

10. The electronic apparatus of claim 9, wherein the processor is further configured to control the electronic apparatus to perform the touch input function corresponding to the guide UI and provide a visual feedback indicative of performing the touch input function.

11. A method of controlling an electronic apparatus, the method comprising:
receiving a user input;
obtaining a response text related to the user input based on a machine reading comprehension (MRC) model;
obtaining information about a plurality of operations for controlling the electronic apparatus from the response text, wherein the plurality of operations are required to complete a function corresponding to the obtained response text, and wherein the information comprises sequence information indicating an order of the plurality of operations;
obtaining information about a current setting state of the electronic apparatus, the current setting state of the electronic apparatus including at least information about one or more applications installed in the electronic apparatus and a screen being displayed through the display;

identifying a sub-operation for each of the plurality of operations required to complete the function corresponding to the obtained response text that is not included in the plurality of operations;

based at least on the information about the current setting state of the electronic apparatus and one or more operations pre-performed in the electronic apparatus before the user input is received, identify at least one of the identified sub-operations as additional operational information required to complete the function corresponding to the obtained response and update the plurality of operations to include one or more additional operations corresponding to the additional operational information and the sequence information indicating the order of the updated plurality of operations; and providing a guide user interface (UI) to sequentially perform the updated plurality of operations comprising the one or more additional operations based on the updated sequence information, wherein the guide UI comprises a UI to perform the updated plurality of operations based on information related to a touch input to execute the updated plurality of operations.

12. The method of claim 11, wherein the obtaining information about the plurality of operations comprises dividing the response text by a unit of operation based on a context requiring a touch input.

13. The method of claim 11, comprising:
obtaining an additional operation required to complete the function, in addition to the updated plurality of operations.

14. The method of claim 13, wherein the providing the guide UI comprises:
providing the guide UI based on information related to a touch input required to execute a first operation of the updated plurality of operations; and
based on a context of the electronic apparatus being changed based on the touch input by a user corresponding to the guide UI, providing a next guide UI based on information related to a touch input required to execute the additional operation.

15. The method of claim 14, wherein the information related to the touch input comprises at least one of a position or a touch type of the touch input.

16. The method of claim 11, wherein the MRC model comprises a question generation (QG) model to obtain a question and a question answer (QA) model to obtain an answer corresponding to the obtained question by performing a natural language processing (NLP) based on a plurality of sentences included in a manual of the electronic apparatus.

17. The method of claim 11, wherein the obtaining the text comprises:
transmitting the user input to a server,
wherein the response text is obtained based on a manual and the MRC model of the electronic apparatus.

18. The method of claim 11, comprising:
based on an identification that at least one of a position or a touch type of a touch input of a user when the guide UI is displayed not corresponding to the guide UI, providing at least one of a visual feedback or a sound feedback.

19. The method of claim 11, wherein the response text includes a request to change a plurality of different settings of the electronic apparatus, and a first operation of the updated plurality of operations corresponds to one of the plurality of different settings of the electronic apparatus included in the request and a second operation of the updated plurality of operations corresponds to changing a setting of the electronic apparatus that is not included in the plurality of different settings of the electronic apparatus included in the request.

* * * * *